June 1, 1954

D. McDONALD 2,680,048

HUMIDOR

Filed July 21, 1950

*INVENTOR.*
DONALD McDONALD

*BY*
DES JARDINS, ROBINSON & KEISER

*Howard S Keiser*

HIS ATTORNEYS

Patented June 1, 1954

2,680,048

UNITED STATES PATENT OFFICE 2,680,048

HUMIDOR

Donald McDonald, Chicago, Ill.

Application July 21, 1950, Serial No. 175,096

11 Claims. (Cl. 312—31.1)

This invention relates to a humidor for preserving in fresh condition fruit products, cigars and the like, and it particularly pertains to a humidor having a storage chamber surrounded by enclosing walls, one of which is provided with a water-containing chamber or reservoir that is closed by a removable stopper or cartridge carrying a mass of absorbent material.

The water-containing chamber or reservoir is preferably formed in the lid or cover which is fitted to the main body portion of the humidor. It is of any shape or size with a neck portion in which the stopper or plug is fitted. The stopper or plug is made in sections spaced apart to form a space or chamber therebetween in which absorbent material is contained in compressed condition for expanding the stopper sections to hold them tightly in place within the neck of the water-containing chamber. The sections of the stopper may be separated or joined together.

One of the principal objects of my invention is to provide a humidor which is simple in construction and efficient in operation.

Another object of the invention is to provide a humidor having a water-containing chamber with a removable stopper or plug for said water-containing chamber carrying a mass of absorbent material for retarding the transfer of the moisture to the humidor.

Another object of the invention is to provide a combined stopper and absorbent material supporting means.

Further objects, and objects relating to details of construction, will readily appear from the detailed description to follow. In one instance I have accomplished the objects of my invention by the device and means set forth in the following specification. My invention is clearly defined and pointed out in the appended claims. A structure constituting a preferred embodiment of my invention is illustrated in the accompanying drawings forming a part of this specification in which:

Figure 1:
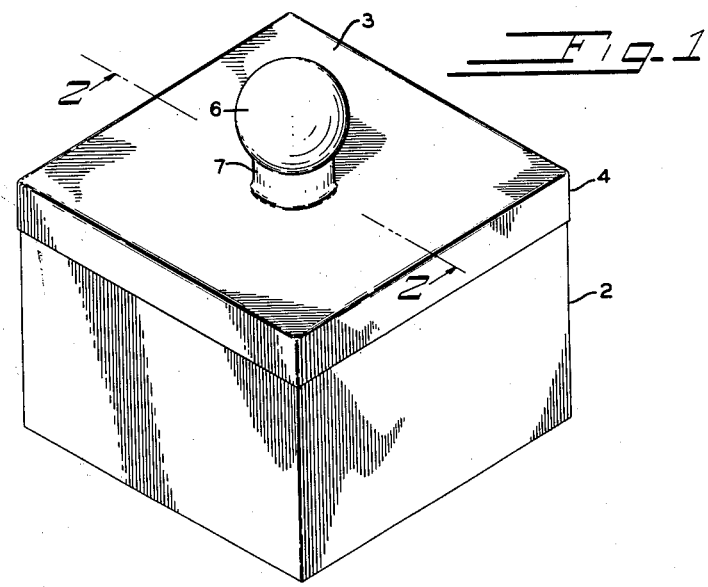
Fig. 1 is a perspective view of a humidor embodying my invention.
Figure 2:
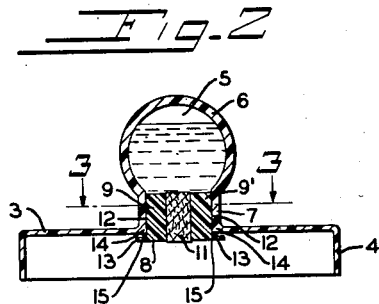
Fig. 2 is a vertical cross sectional view on line 2—2 of the cover in Fig. 1.
Figure 3:
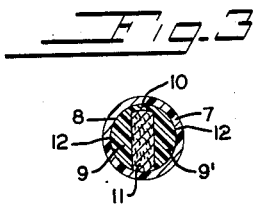
Fig. 3 is a view on line 3—3 of Fig. 2 looking in the direction of the arrows.

The invention generally described comprises a box-like receptacle of any size or shape having a main body or bottom section with a walled chamber therein that is closed by a lid or cover snugly fitted to the main body portion. Fruit products, cigars or the like are placed within the humidor to preserve them in a moist condition. One of the walls of the humidor, preferably the lid or cover, has a water-containing chamber formed therein with a neck portion open to the chamber of the humidor. The water-containing chamber is in a tubular body member of any shape for carrying a supply of water, but it preferably is generally spherical in shape with a constricted neck portion for a stopper or plug to be inserted therein.

The stopper or plug is made in sections with the outside walls conforming to the cross-section of the neck of the water-containing chamber, and the inside walls of the stopper form a chamber or space for receiving a wad or cartridge of absorbent material. The sections may be joined together. There is an outwardly extending flange on each of the stopper sections to overhang the edge surrounding the neck of the water-containing chamber, and the stopper sections and the absorbent material are held in assembled relation by a surrounding elastic band or gasket disposed adjacent the flanges. Accordingly, this surrounding band is in position to serve as a gasket or seal between the stopper and the wall of the water-containing chamber in the lid or cover.

Referring specifically to the drawings in which like numerals are used to designate like parts, numeral 2 is the bottom or main body section of the humidor which is made from any suitable material, preferably transparent so that the interior of the humidor can be viewed without removing the lid or cover. Transparent thermoplastic or thermosetting compositions are especially suitable inasmuch as they can be molded into any shape and are light in weight, strong and very durable. The humidor can be of any size or shape, but is illustrated in the disclosed embodiment as rectangular. The humidor is especially suitable for storing food products which are placed in a refrigerator, and rectangular ones pack more compactly. A cover or lid 3 of the same shape as the bottom or main section is provided with a surrounding flange 4 for fitting over the top edge of the main body or bottom section.

One of the walls of the main body or bottom section of the humidor or the cover or lid is provided with a water-containing chamber 5 within a bulb or housing 6 that is integrally formed in the wall or separately formed and attached thereto. The water-containing chamber in the illustrated embodiment is formed in the lid or cover. There is a restricted portion or neck 7 for the water-containing chamber.

A stopper unit 8 comprising a pair of sections 9 and 9' connected along their edges at one side by a web 10, is insertable within the neck of the water-containing chamber and carries a cartridge of absorbent material 11 in the space along the web between the sections. The web 10 not only joins the sections together but is somewhat yieldable so that the stopper will snugly fit within the neck of the water-containing chamber to close it and confine the water supply except as it may pass through the absorbent material. Each of the sections of the stopper unit has a semi-cylindrical wall portion 12 with an angular flange 13 at one end disposed to overhang the edge 14 which surrounds the neck of the water-containing chamber. A rubber band 15 is fitted around the sections of the stopper unit, immediately beneath the flange ends, to hold them and the interposed absorbent material assembled, and also to serve as a gasket or sealing ring between the flanges of the stopper sections and the edge 14 on the cover or lid surrounding the neck. The wad or cartridge of absorbent material between the sections of the stopper unit is compressed upon insertion of the stopper unit within the neck to make a tight fit with the surrounding wall of the neck. It is readily inserted between the stopper sections when the stopper unit is assembled, and it may be readily removed when the stopper unit is disassembled. The absorbent material may be of any suitable material, such as cotton, and the sections of the stopper may be formed from any moldable thermoplastic or thermosetting moldable plastic composition.

From the foregoing description of the humidor, its construction and use is obvious. The main body section and the lid or cover are made from any suitable material, preferably transparent so that the contents within the container may be readily viewed without removing the cover. They can be molded from thermoplastic or thermosetting plastic composition. The chamber of the bulb or housing in the cover or lid is filled with water which is confined therein by the stopper unit that is inserted within the neck of the water-containing chamber. The absorbent material within the stopper will restrict and regulate the passage of moisture from the water chamber to the chamber of the humidor in which food or other products is contained.

I am aware that there may be various changes in the construction of the preferred embodiment herein illustrated and described without departing from the spirit of the invention, and, accordingly, my invention is limited only by the appended claims.

Having thus described my invention, what I claim as new and useful and desire to secure by United States Letters Patent, is:

1. A humidor comprising a tubular body member in which a supply of water is adapted to be contained and having a neck portion, and a radially yieldable stopper having a vertical opening therethrough and in from one side of the surrounding wall to a point closely adjacent the opposite side of said wall to divide said stopper into a pair of sections connected by a yieldable web, the opening being filled with absorbent material that is placed within said opening, said stopper being press-fitted within the neck of the tubular member to radially compress said absorbent material.

2. A humidor comprising a tubular member having a neck portion, a radially yieldable sectional stopper having an opening therethrough completely covered with absorbent material that is placed within said opening, said stopper being press-fitted in the neck portion of the tubular member to radially compress said absorbent material, and an elastic band encircling the section stopper and absorbent material to hold them assembled prior to their assembly in the neck portion of the tubular member.

3. A humidor as set forth in claim 1 in which each of the stopper sections is provided with a flange overhanging the edge of the neck portion and the elastic band surrounds the sections between the flanges and the edge of the neck portion to form a sealing gasket between the stopper and the water-containing chamber.

4. A humidor comprising a main body portion and a detachable cover forming a storage chamber within a surrounding wall, a water-containing chamber formed within the cover and having a neck portion opening within the storage chamber, a stopper for the neck portion comprising a plurality of sections, absorbent material disposed between said plurality of stopper sections and being radially compressed therebetween, and yieldable means for holding the stopper sections and the absorbent material assembled in a unit prior to the assembly of said unit in the neck portion of the chamber.

5. A humidor as set forth in claim 4 in which the stopper sections are provided with a flange for overhanging the neck portion and the yieldable means is a ring between the flange and the neck portion.

6. A humidor as set forth in claim 5 in which the yieldable ring surrounds the stopper sections.

7. A humidor as set forth in claim 6 in which the yieldable ring surrounds the stopper sections and seats against the flange.

8. A humidor comprising a tubular body member in which a supply of water is adapted to be contained and having a neck portion, a radially compressible perforated stopper comprised of a pair of sections yieldably connected for being pressed fitted within the neck, and absorbent material closing the perforation in the stopper and held in place by the radially compressible stopper.

9. A humidor as set forth in claim 8 in which the perforated stopper is compressibly held within the neck of the chamber by the resiliency of one of the members.

10. A humidor comprising a tubular body member in which a supply of water is adapted to be contained having a rounded end disposed oppositely to an open end, a radially compressible detachable stopper fitted directly to the open end of the body member and provided with an opening extending therethrough between a surrounding wall that is interrupted on one side by said opening which extends closely adjacent to the opposite side of the wall, and absorbent material mounted within the opening of the stopper and secured therein as a unitary part of the stopper by the radial compression of said stopper.

11. A humidor comprising a tubular body member adapted to contain a supply of water and having a neck portion, a radially compressible stopper fitted directly to the neck portion having an opening formed therethrough for dividing said stopper into two sections connected by a yieldable web, and absorbent material closing the stopper opening, said stopper comprising sections assembled as a unit with the absorbent material radially compressed between the said stopper sections.

References Cited in the file of this patent

UNITED STATES PATENTS

| Number | Name | Date |
|---|---|---|
| 893,740 | Leeper | July 21, 1908 |
| 1,054,159 | Wilson | Feb. 25, 1913 |
| 1,129,897 | Owen | Mar. 2, 1915 |
| 1,656,757 | Ross | Jan. 17, 1928 |
| 2,219,959 | Laidley | Oct. 29, 1940 |

FOREIGN PATENTS

| Number | Country | Date |
|---|---|---|
| 198,979 | Great Britain | June 14, 1923 |
| 584,271 | France | Feb. 3, 1925 |